United States Patent [19]
Durfee et al.

[11] Patent Number: 5,247,045
[45] Date of Patent: Sep. 21, 1993

[54] HYDROSILYLATION PROCESS FOR PREPARATION OF NOVEL CHLORINE END-TERMINATED ORGANOSILOXANES

[75] Inventors: Loren D. Durfee; Terrence K. Hilty, both of Midland, Mich.

[73] Assignee: Dow Corning Corporation, Midland, Mich.

[21] Appl. No.: 912,363

[22] Filed: Jul. 13, 1992

[51] Int. Cl.$^5$ .............................................. C08G 77/06
[52] U.S. Cl. ....................................... 528/15; 528/31; 556/462; 556/466; 556/452
[58] Field of Search ................ 528/15, 31; 556/462, 556/466, 452, 479

[56] References Cited

U.S. PATENT DOCUMENTS 2,851,473  9/1958  Wagner et al. .
3,440,263  4/1969  Brennan .
4,166,078  8/1979  Getson .
4,741,966  5/1988  Cavezzan ............................. 528/15
4,782,172  11/1988  Niswonger et al. ................ 556/466

FOREIGN PATENT DOCUMENTS 2166867  4/1976  Fed. Rep. of Germany .
1104206  3/1966  United Kingdom .

*Primary Examiner*—Melvyn I. Marquis
*Attorney, Agent, or Firm*—William F. Boley

[57] ABSTRACT

The present invention is novel chlorine end-terminated organosiloxanes and a hydrosilylation process for their preparation. The process comprises contacting a chlorine end-terminated (organohydrogen)siloxane and an α-olefin in the presence of a platinum catalyst, at a temperature of 50° C. to 200° C. The products of this process are chlorine end-terminated organosiloxanes.

57 Claims, No Drawings

5,247,045

HYDROSILYLATION PROCESS FOR PREPARATION OF NOVEL CHLORINE END-TERMINATED ORGANOSILOXANES

BACKGROUND OF INVENTION

The present invention is novel chlorine end-terminated organosiloxanes and a hydrosilylation process for their preparation. The process comprises contacting a chlorine end-terminated (organohydrogen)siloxane and an α-olefin in the presence of a platinum catalyst, at a temperature of 50° C. to 200° C. The products of this process are chlorine end-terminated organosiloxanes.

The reaction of olefins with SiH containing compounds is well known. For example, Wagner et al., U.S. Pat. No. 2,851,473, issued Sep. 9, 1958. describe the use of platinum deposited on the gamma allotrope of alumina to catalyze the reaction between molecules containing C=C bonds and SiH containing monomers.

British Patent No. 1,104,206, published Feb. 21, 1968, describes a process where a silicon compound containing at least one silicon-bonded hydrogen atom per molecule and not more than two hydrogen atoms attached to any one silicon atom is reacted with a compound containing aliphatically unsaturated carbon atoms in the presence of a platinum complex. Specific examples of compounds containing aliphatically unsaturated carbon atoms include compounds containing one and two unsaturated bonds.

German Patent Application No. P-2,166,867.7, published Apr. 22, 1976, describes a process where the reaction of trichlorosilane or methyldichlorosilane with a triene is catalyzed with platinum compounds to form bis-silyl olefins. The bis-silyl olefins are further reacted with polymeric unsaturated hydrocarbon chains in the presence of a Lewis acid and a metathesis catalyst to form polymeric hydrocarbons with reactive silyl terminal groups.

Brennan, U.S. Pat. No. 3,440,263, issued Apr. 22, 1969, describes a process in which olefinic compounds containing at least one unsaturated bond are reacted with siloxane polymers containing SiH bonds to form alkylated siloxanes. The siloxane polymers employed by Brennan were end-terminated with hydrogen, hydrocarbyl groups, or alkoxyl groups. Platinum or platinum compounds supported on charcoal were reported as a suitable catalyst for the process.

Getson, U.S. Pat. No. 4,166.078, issued Aug. 28, 1979, describes a process where a modified polyorganosiloxane composition containing in situ generated particulate matter is prepared by reacting an poly(organohydrogen)siloxane with monomers containing aliphatic unsaturated in the presence of free radical initiators. Getson further describes a process where the modified polyorganosiloxane composition is reacted with a compound having at least two vinyl groups per molecule as a cross-linking agent and a catalyst which promotes the addition of SiH groups present in the modified polyorganosiloxane composition to vinyl groups of the cross-linking agent. Platinum is described as a suitable catalyst for the cross-linking process.

The cited art does not recognize that α-olefins can be hydrosilylated with chlorine end terminated (organohydrogen)siloxanes in the presence of a platinum catalyst without affecting the reactive chlorine substituents. The novel chlorine end-terminated organosiloxanes prepared by this process are compatible in oils and waxes and can be used as additives to improve the glide properties of, for example, textile fibers and sound recording materials. They can also be included internally in polymer materials to improve both the processing and finished properties. The presence of the reactive end-terminal chlorines provides a means by which the siloxanes can be bonded to surfaces to provide durable surface treatments. In addition, the chlorine end-terminated organosiloxanes can be used as intermediates to make block copolymers.

SUMMARY OF INVENTION

The present invention is novel chlorine end-terminated organosiloxanes and a hydrosilylation process for their preparation. The process comprises contacting a chlorine end-terminated (organohydrogen)siloxane and an α-olefin in the presence of a platinum catalyst, at a temperature of 50° C. to 200° C. The products of this process are chlorine end-terminated organosiloxanes.

DESCRIPTION OF INVENTION

The present invention is novel chlorine end-terminated organosiloxanes and a process for their preparation. The process comprises:

(A) contacting a chlorine end-terminated (organohydrogen)siloxane described by formula

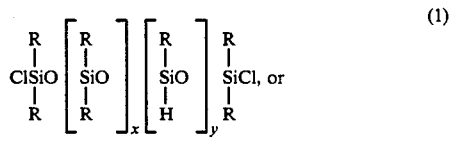 (1)

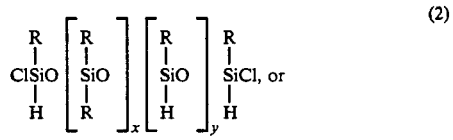 (2)

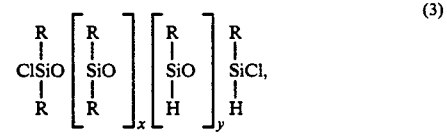 (3)

where each R is a radical independently selected from a group consisting of alkyls comprising one to 20 carbon atoms, cycloalkyls comprising four to 20 carbon atoms, haloalkyls comprising one to 20 carbon atoms, and aryls, x=0 to 50, y=1 to 50, and x+y=1 to 100; with an α-olefin described by formula

 (4)

where each $R^1$ is a radical independently selected from a group consisting of hydrogen, R, alkenyls comprising one to 20 carbon atoms, dienyls comprising one to 20 carbon atoms, aryls, and polyetheryls described by formula $-(CH_2)_a\{O(CH_2)_b\}_cOR^2$ is selected from a group consisting of hydrogen, glycidyl, alkyls comprising one to 20 carbon atoms and acyl radicals described by formula $R^3CO-$, $R^3$ is an alkyl comprising one to 10 carbon atoms, a=1 to 10, b=1 to 10, and c=0 to 100; in the presence of a platinum catalyst and at a temperature within a range of 50° C. to 200° C.; and (B) recovering a chlorine end-terminated organosiloxane described by formula

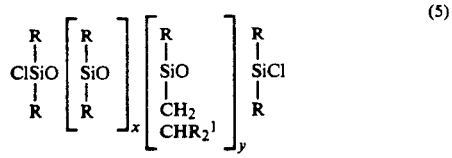
(5)

when the chlorine end-terminated (organohydrogen)siloxane is described by formula (1), a chlorine end-terminated organosiloxane described by formula

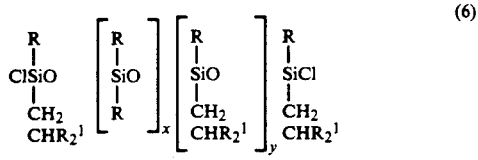
(6)

when the chlorine end terminated (organohydrogen)siloxane is described by formula (2), and a chlorine end-terminated organosiloxane described by formula

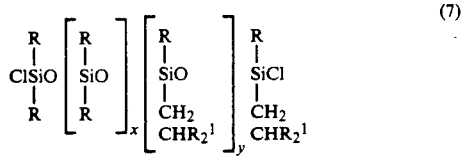
(7)

when the chlorine end-terminated (organohydrogen)siloxane is described by formula (3): where R, $R^1$, x, and y are as previously described.

The present process can be run as a continuous process or as a batch process in reactors of standard design. A batch process is preferred. When a homogeneous platinum catalyst is used in the process, the process can be run, for example, in a stirred-tank reactor. When a heterogeneous platinum catalyst is used in the process, the reactor can be, for example, a fixed-bed, a stirred-bed, or a fluidized-bed In a typical batch-type process, a mixture comprising the α-olefin and the platinum catalyst is formed in the reactor. Then, the chlorine end-terminated (organohydrogen)siloxane is added to the reactor at a rate to control heat build-up from the resultant exothermic reaction. In a continuous-type process a mixture comprising the chlorine end-terminated (organohydrogen)siloxane and the α-olefin can be contacted at a controlled rate with a particulate catalyst bed.

Optimal contact time for the chlorine end-terminated (organohydrogen)siloxane and the α-olefin in the presence of the platinum catalyst will depend upon such factors as the nature of the platinum catalyst, the chemical structures of the reactants, and the temperature at which the process is conducted. In general, contact times of 15 minutes to five hours are considered useful. Contact times of 30 minutes to two hours are preferred. Shorter contact times may be used, but may result in reduced yield of the desired product. Longer contact times may also be used, but to no perceived advantage.

The chlorine end-terminated (organohydrogen)siloxanes which can be reacted in the present process are described by formula (1), formula (2), and formula (3).

In each of these three formulas each R is a radical independently selected from a group consisting of alkyls comprising one to 20 carbon atoms, cycloalkyls comprising four to 20 carbon atoms, haloalkyls comprising one to 20 carbon atoms, and aryls. The radical R can be, for example, methyl, ethyl, propyl, isopropyl, tert-butyl, decyl, chloromethyl, bromomethyl, iodomethyl, 3,3,3-trifluoropropyl, pentafluoroethyl, cyclopentyl, cyclohexyl, cyclodecyl, phenyl, tolyl, and xylyl. Preferred is where R is methyl.

The chlorine end-terminated (organohydrogen)siloxanes described by formula (1), formula (2), and formula (3) comprise diorganosiloxy groups of formula —($R_2$SiO)$_x$— and (organohydrogen)siloxy groups of formula —(RHSiO)$_y$—, where x can be a value from zero to 50, y can be a value from one to 50, and x+y=1 to 100. The diorganosiloxy and (organohydrogen)siloxy groups may be randomly distributed within the chlorine end-terminated (organohydrogen)siloxanes. It is preferred that the sum of x+y be within a range of about 5 to 50. The optimal ratio of x to y will depend upon the value of x+y and the degree of organofunctionality and organic compatibility required. In general, it is preferred that y be a value within a range of about 5 to 50.

The α-olefins useful in the present invention are described by formula (4). The α-olefin has two independently selected substituents designated as $R^1$. Each $R^1$ is a radical independently selected from a group consisting of hydrogen, R, alkenyls comprising one to 20 carbon atoms, dienyls comprising one to 20 carbon atoms, aryls, and polyetheryls described by formula —(CH$_2$)$_a${O(CH$_2$)$_b$}$_c$O$R^2$, where $R^2$ is selected from a group consisting of hydrogen, glycidyl alkyls comprising one to 20 carbon atoms, and acyl radicals described by formula $R^3$CO—, $R^3$ is an alkyl comprising one to 10 carbon atoms, a=1 to 10, and b=1 to 10. When $R^1$ is a polyetheryl, it is preferred that $R^2$ be the glycidyl radical. When $R^1$ is a polyetheryl it is preferred that a=1 to 3, b=2 to 3, and c=0 to 30.

The α-olefin can be, for example, ethylene, 1-propene, 1-hexene, 1-octadecene, 1-eicosene, butadiene, 1,4,7-octatriene, 1,5,9-decatriene, 1,6,11-dodecatriene, styrene, methylstyrene, and allylglycidylether.

The α-olefin is added to the process in slight molar excess in relation to the silicon bonded hydrogen present in the chlorine end-terminated (organohydrogen)siloxanes. By slight stoichiometric excess is meant that there is one percent to ten percent molar excess of the α-olefin.

The chlorine end-terminated (organohydrogen)siloxanes and α-olefin are contacted in the presence of an effective concentration of a platinum catalyst which facilitates the hydrosilylation of the unsaturated alpha bond of the α-olefin. The platinum catalyst can be, for example, platinum metal, platinum compounds, or platinum complexes. The platinum catalyst can be, for example, platinum metal, $H_2PtCl_6.6H_2O$, Pt*{(CH$_2$=CHME$_2$ Si)$_2$O}$_2$, Pt*{(CH$_2$=CHMe$_2$ Si)$_2$O}(CH$_2$CH$_2$CH$_2$)$_2$, K(C$_2$H$_4$PtCl$_2$), (CH$_2$CH$_2$S)$_2$PtCl$_2$, Pt$_2$}(CH$_2$=CH)Me$_2$SiO}$_3$, and dichlorobis(ethylene)-μ,μ-dichloroplatinum(II). Preferred is when the platinum catalyst is selected from a group consisting of platinum metal and $H_2PtCl_6.6H_2O$.

The present platinum catalyzed process may be run as either a homogeneous process or as a heterogeneous process. When the process is run as a heterogeneous process, the platinum catalyst may be supported on a solid support material. The solid support material can be any inert material of appropriate size and with the ability to retain the platinum catalyst. The platinum catalyst may be retained on or within the solid support material by standard means, for example, adsorption, ionic bonding, covalent bonding, or physical entrapment. The solid support material may be, for example, carbon activated carbon, graphite, silica, silica gel, alumina, alumina-silica, and diatomaceous earth. A preferred solid support material is activated carbon. The solid support material can be in the form of, for example, particles, powders, flakes, chips, chunks, and pellets.

The size of the solid support material is not critical to the present invention. In general, solid support materials with diameters within a range of about $15\mu$ to 10 mm are considered useful. The lower size limit is determined principally by the ability to handle and recover the supported platinum catalyst. The upper size limit is determined principally by the ability to provide sufficient platinum catalyst for the process to run at an economically reasonable rate. A preferred diameter for the solid support material is within a range of about 0.5 mm to 5.0 mm.

The weight of platinum catalyst retained on the solid support can be within a range of about 0.2 to 50 weight percent platinum. Preferred, is when the weight of platinum catalyst retained on the solid support is within a range of about 0.5 to 5.0 weight percent platinum. The weight percent of platinum on the solid support is calculated as the weight of platinum atoms retained by the solid support divided by the weight of the solid support, the quotient multiplied by 100.

An effective concentration of platinum catalyst in the present process is where the weight of platinum is about 0.0001 to 0.5 percent of the combined weight of the chlorine end-terminated (organohydrogen)siloxane and α-olefin added to the process. Preferred is where the concentration of platinum is about 0.001 to 0.1 weight percent of the combined weight of chlorine end-terminated (organohydrogen)siloxane and α-olefin added to the process.

The present process can be conducted at a temperature within a range of about 50° C. to 200° C. A preferred temperature for conducting the process is within a range of about 65° C. to 170° C. The preferred method for conducting the present process is by refluxing the reaction mixture at a temperature within a range of about 65° C. to 170° C.

To facilitate refluxing within the preferred temperature range, an inert organic solvent may be added to the process. Any organic solvent which is inert in the present process and has a boiling point within a range of about 50° C. to 200° C. may be used for this purpose. The organic solvent can be, for example, hexane, heptane benzene, and toluene. The organic solvent may be present in the process within a weight range of about one to 30 weight percent of the combined weight of the chlorine end-terminated (organohydrogen)siloxane and α-olefin added to the process.

Recovery of chlorine end-terminated organosiloxanes as described by formula (5), formula (6), and formula (7) can be accomplished by standard means, for example, the products can be vacuum stripped, distilled, filtered, or any combination thereof. Recovery of the products may include retaining or using the products without further processing.

The following examples are provided to illustrate the present invention. The examples are not intended to limit the scope of the claims herein.

EXAMPLE 1

A chlorine end-terminated (methylhydrogen) siloxane was reacted with 1 hexene in the presence of a supported platinum catalyst. The process was conducted in a 200 mL round-bottom flask. A 10% molar excess of 1-hexene. 31.7 g, was placed in the flask along with I g of 0.5% platinum supported on carbon catalyst. The platinum on carbon catalyst was obtained from Engelhard (Newark, N.J.) and consisted of 0.5% w/w platinum on 2.4 mm×4.8 mm activated carbon particles. The 1-hexene and catalyst mixture was heated to 65° C. and then 21.2 g of chlorine end-terminated (methylhydrogen)siloxane of formula ClHMeSiO(HMeSiO)$_{35}$SiMeHCl was slowly added to the flask. The resultant exothermic reaction raised the temperature of the flask content to about 105° C. After addition of the siloxane, the flask content was heated for about one hour at 100° C. Excess 1-hexene was stripped from the product mixture under vacuum. The resultant stripped product was a liquid. Analysis of the product by Fourier transform infrared spectroscopy (FTIR) showed that 99% of the SiH bonds had reacted as evidence by the near absence of an absorption band between 2100-2200 cm$^{-1}$.

EXAMPLE 2

A chlorine end terminated (methylhydrogen) siloxane was reacted with 1-octadecene in the presence of a platinum catalyst. The process was similar to that described in Example 1. A 10% molar excess of 1 octadecene, 49.1 g. was placed into a flask along with 1 g of 0.5% platinum on carbon catalyst the platinum catalyst was as previously described in example 1. Three grams of hexane was added to the reaction flask as a refluxing aid. The 1-octadecene, hexane, and catalyst mixture was heated to 90° C. Then, 9.8 g of chlorine end-terminated (methylhydrogen)siloxane of formula ClHMeSiO(HMeSiO)$_{35}$SiMeHCl was slowly added to the flask. The temperature of the flask content was about 130° C. after addition of the siloxane. After addition of the siloxane, the flask content was heated for an additional hour at about 130° C. Excess 1-octadecene was then vacuum stripped from the flask content. The resultant stripped product was a waxy material having a melting point of about 53° C. The product was shown by FTIR to have about 9% residual SiH.

I claim:

1. A process for preparation of chlorine end-terminated organosiloxanes, the process comprising:
   (A) contacting a chlorine end-terminated (organohydrogen)siloxane described by formula

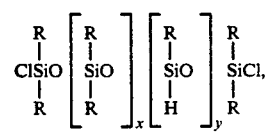

where each R is a radical independently selected from a group consisting of alkyls comprising one to 20 carbon atoms, cycloalkyls comprising four to 20 carbon atoms, haloalkyls comprising one to 20 carbon atoms, and aryls, x=0 to 50, y=1 to 50, and x+y=1 to 100; with an α-olefin described by formula

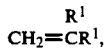

where each $R^1$ is a radical independently selected from a group consisting of hydrogen, R, alkenyls comprising one to 20 carbon atoms, dienyls comprising one to 20 carbon atoms, and polyethyeryls described by formula —$(CH_2)_a\{O(CH_2)_b\}_c OR^2$, $R^2$ is selected from a group consisting of hydrogen, glycidyl, alkyls comprising one to 20 carbon atoms, and acyl radicals described by formula $R^3CO$—, $R^3$ is an alkyl comprising one to 10 carbon atoms, a=1 to 10, b=1 to 10, and c=0 to 100; in the presence of a platinum catalysts and at a temperature within a range of 50° C, to 200° C.; and (B) recovering a chlorine end-terminated organosiloxane described by formula

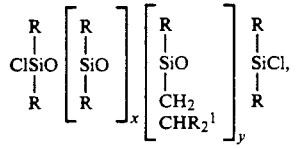

where R, $R^1$, x, and y are as previously described.

2. A process according to claim 1, where the chlorine end-terminated (organohydrogen)siloxane, α-olefin, and platinum catalyst are contacted for a time period within a range of 30 minutes to two hours.

3. A process according to claim 1, where R is methyl.

4. A process according to claim 1 where y=5 to 50 and x+y=5 to 50.

5. A process according to claim 1, where $R^1$ is a polyetheryl, $R^2$ is a glycidyl radical, a=1 to 3, b=2 to 3, and c=0 to 30.

6. A process according to claim 1, where the α-olefin is selected from a group consisting of 1-hexene, styrene, methylstyrene, and allylglycidylether.

7. A process according to claim 1, where the α-olefin is present in one percent to ten percent molar excess relative to SiH groups in the chlorine end-terminated (organohydrogen)siloxane.

8. A process according to claim 1, where the platinum catalyst is selected from a group consisting of platinum metal and $H_2PtCl_6.6H_2O$.

9. A process according to claim 1, where the concentration of platinum is about 0.001 to 0.1 weight percent of the combined weight of chlorine end-terminated (organohydrogen)siloxane and the α-olefin added to the process.

10. A process according to claim 1, where the temperature is within a range of about 65° C. to 170° C.

11. A process according to claim 1, where the platinum catalyst is retained on a solid support.

12. A process according to claim 11, where the weight of platinum catalyst retained on the solid support is within a range of about 0.5 to 5.0 weight percent platinum based on the weight of the solid support.

13. A process according to claim 12, where the solid support is activated carbon.

14. A process according to claim 11, where the concentration of platinum is about 0.001 to 0.1 weight percent of the combined weight of chlorine end-terminated (organohydrogen)siloxane and the α-olefin added to the process.

15. A process according to claim 1, where the chlorine end-terminated (organohydrogen)siloxane, the α-olefin, and the platinum catalyst are contacted for a time within a range of 30 minutes to two hours, R is methyl, x+y=5 to 50, y=5 to 50; the α-olefin is selected from a group consisting of 1-hexene, styrene, methylstyrene, and allylglycidylether; the platinum catalyst is selected from a group consisting of platinum metal and $H_2PtCl_6.6H_2O$; the concentration of platinum catalyst is within a range of 0.001 to 0.1 weight percent of the combined weight of the chlorine end-terminated (organohydrogen)siloxane and the α-olefin, and the temperature is within a range of about 65° C. to 170° C.

16. A process according to claim 15, where the platinum catalyst is on a solid support and the solid support is activated carbon.

17. A process for preparation of chlorine end-terminated organosiloxanes, the process comprising:

(A) contacting a chlorine end-terminated (organohydrogen)siloxane described by formula

where each R is a radical independently selected from a group consisting of alkyls comprising one to 20 carbon atoms, cycloalkyls comprising four to 20 carbon atoms, haloalkyls comprising one to 20 carbon atoms, and aryls, x=0 to 50, y=1 to 50, and x+y=1 to 100; with an α-olefin described by formula

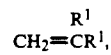

where each $R^1$ is a radical independently selected from a group consisting of hydrogen, R, alkenyls comprising one to 20 carbon atoms, dienyls comprising one to 20 carbon atoms, and polyetheryls described by formula —$(CH_2)_a\{O(CH_2)_b\}_c OR^2$, $R^2$ is selected from a group consisting of hydrogen, glycidyl, alkyls comprising one to 20 carbon atoms, and acyl radicals described by formula $R^3CO$—, $R^3$ is an alkyl comprising one to 10 carbon atoms, a=1 to 10, b=1 to 10, and c=0 to 100; in the presence of a platinum catalysts and at a temperature within a range of 50° C, to 200° C.; and (B) recovering a chlorine end-terminated organosiloxane described by formula

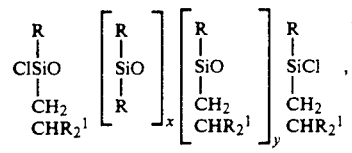

where R, $R^1$, x, and y are as previously described.

18. A process according to claim 17, where the chlorine end-terminated (organohydrogen)siloxane, α-olefin, and platinum catalyst are contacted for a time period within a range of 30 minutes to two hours.

19. A process according to claim 17, where R is methyl.

20. A process according to claim 17, where y=5 to 50 and x+y=5 to 50.

21. A process according to claim 17, where $R^1$ is a polyetheryl, $R^2$ is a glycidyl radical, a=1 to 3, b=2 to 3, and c=0 to 30.

22. A process according to claim 17, where the α-olefin is selected from a group consisting of 1-hexene, styrene, methylstyrene, and allylglycidylether.

23. A process according to claim 17, where the α-olefin is present in one percent to ten percent molar excess relative to SiH groups in the chlorine end-terminated (organohydrogen)siloxane.

24. A process according to claim 17, where the platinum catalyst is selected from a group consisting of platinum metal and $H_2PtCl_6.6H_2O$.

25. A process according to claim 17, where the concentration of platinum is about 0.001 to 0.1 weight percent of the combined weight of chlorine end-terminated (organohydrogen)siloxane and the α-olefin added to the process.

26. A process according to claim 17, where the temperature is within a range of about 65° C. to 170° C.

27. A process according to claim 17, where the platinum catalyst is retained on a solid support.

28. A process according to claim 27, where the weight of platinum catalyst retained on the solid support is within a range of about 0.5 to 5.0 weight percent platinum based on the weight of the solid support.

29. A process according to claim 27, where the solid support is activated carbon.

30. A process according to claim 27, where the concentration of platinum is about 0.001 to 0.1 weight percent of the combined weight of chlorine end-terminated (organohydrogen)siloxane and the α-olefin added to the process.

31. A process according to claim 17, where the chlorine end-terminated (organohydrogen)siloxane, the α-olefin, and the platinum catalyst are contacted for a time within a range of 30 minutes to two hours, R is methyl, x+y=5 to 50, y=5 to 50; the α-olefin is selected from a group consisting of 1-hexene, styrene, methylstyrene, and allylglycidylether; the platinum catalyst is selected from a group consisting of platinum metal and $H_2PtCl_6.6H_2O$; the concentration of platinum catalyst is within a range of 0.001 to 0.1 weight percent of the combined weight of the chlorine end-terminated (organohydrogen)siloxane and the α-olefin, and the temperature is within a range of about 65° C. to 170° C.

32. A process according to claim 31, where the platinum catalyst is on a solid support and the solid support is activated carbon.

33. A process for preparation of chlorine end-terminated organosiloxanes, the process comprising:

(A) contacting a chlorine end-terminated (organohydrogen)siloxane described by formula

where each R is a radical independently selected from a group consisting of alkyls comprising one to 20 carbon atoms, cycloalkyls comprising four to 20 carbon atoms, haloalkyls comprising one to 20 carbon atoms, and aryls, x=0 to 50, y=1 to 50, and x+y=1 to 100; with an α-olefin described by formula

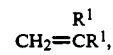

where each $R^1$ is a radical independently selected from a group consisting of hydrogen, R, alkenyls comprising one to 20 carbon atoms, dienyl comprising one to 20 carbon atoms, and polyethyeryls described by formula $-(CH_2)_a\{O(CH_2)_b\}_cOR^2$, $R^2$ is selected from a group consisting of hydrogen, glycidyl, alkyls comprising one to 20 carbon atoms, and acyl radicals described by formula $R^3CO-$, $R^3$ is an alkyl comprising one to 10 carbon atoms, a=1 to 10, b=1 to 10, and c=0 to 100; in the presence of a platinum catalyst and at a temperature within a range of 50° C, to 200° C.; and (B) recovering a chlorine end-terminated organosiloxane described by formula

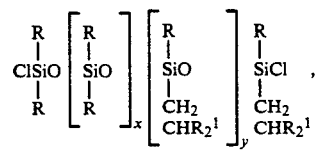

where R, $R^1$, x, and y are as previously described.

34. A process according to claim 33, where the chlorine end-terminated (organohydrogen)siloxane, α-olefin, and platinum catalyst are contacted for a time period within a range of 30 minutes to two hours.

35. A process according to claim 33, where R is methyl.

36. A process according to claim 33, where y=5 to 50 and x+y=5 to 50.

37. A process according to claim 33, where $R^1$ is a polyetheryl, $R^2$ is a glycidyl radical a=1 to 3, b=2 to 3, and c=0 to 30.

38. A process according to claim 33, where the α-olefin is selected from a group consisting of 1-hexene, styrene, methylstyrene, and allylglycidylether.

39. A process according to claim 33, where the α-olefin is present in one percent to ten percent molar excess relative to SiH groups in the chlorine end-terminated (organohydrogen)siloxane.

40. A process according to claim 33, where the platinum catalyst is selected from a group consisting of platinum metal and $H_2PtCl_6.6H_2O$.

41. A process according to claim 33, where the concentration of platinum is about 0.001 to 0.1 weight percent of the combined weight of chlorine end-terminated (organohydrogen)siloxane and the α-olefin added to the process.

42. A process according to claim 33, where the temperature is within a range of about 65° C. to 170° C.

43. A process according to claim 33, where the platinum catalyst is retained on a solid support.

44. A process according to claim 43, where the weight of platinum catalyst retained on the solid support is within a range of about 0.5 to 5.0 weight percent platinum based on the weight of the solid support.

45. A process according to claim 43, where the solid support is activated carbon.

46. A process according to claim 43, where the concentration of platinum is about 0.001 to 0.1 weight percent of the combined weight of chlorine end-terminated (organohydrogen)siloxane and the α-olefin added to the process.

47. A process according to claim 33, where the chlorine end-terminated (organohydrogen)siloxane, the α-olefin, and the platinum catalyst are contacted for a time within a range of 30 minutes to two hours, R is methyl, $x+y=5$ to 50, $y=5$ to 50; the α-olefin is selected from a group consisting of 1-hexene, styrene, methylstyrene, and allylglycidylether: the platinum catalyst is selected from a group consisting of platinum metal and $H_2PtCl_6 \cdot 6H_2O$; the concentration of platinum catalyst is within a range of 0.001 to 0.1 weight percent of the combined weight of the chlorine end-terminated (organohydrogen)siloxane and the α-olefin and the temperature is within a range of about 65° C. to 170° C.

48. A process according to claim 47 where the platinum catalyst is on a solid support and the solid support is activated carbon.

49. A chlorine end-terminated organosiloxane described by formula

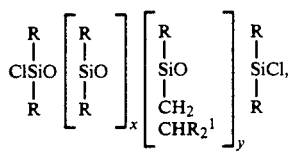

where each R is a radical independently selected from a group consisting of alkyls comprising one to 20 carbon atoms, cycloalkyls comprising four to 20 carbon atoms, haloalkyls comprising one to 20 carbon atoms, and aryls; each $R^1$ is a radical independently selected from a group consisting of dienyls comprising one to 20 carbon atoms and polyetheryls described by formula $-(CH_2)_a\{O(CH_2)_b\}_cOR^2$, $R^2$ is selected from a group consisting of hydrogen, glycidyl, alkyls comprising one to 20 carbon atoms, and acyl radicals described by formula $R^3CO-$, $R^3$ is an alkyl comprising one to 10 carbon atoms, $a=1$ to 10, $b=1$ to 10, and $c=0$ to 100; and $x=0$ to 50, $y=1$ to 50, and $x+y=1$ to 100.

50. A chlorine end-terminated organosiloxane according to claim 49, where R is methyl, $y=5$ to 50, $x+y=5$ to 50, $a=1$ to 3, $b=2$ to 3, and $c=0$ to 30.

51. A chlorine end-terminated organosiloxane according to claim 50 wherein $c=0$ and $R^2$ is a glycidyl radical.

52. A chlorine end-terminated organosiloxane described by formula

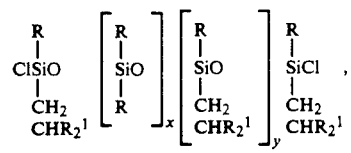

where each R is a radical independently selected from a group consisting of alkyls comprising one to 20 carbon atoms, cycloalkyls comprising four to 20 carbon atoms, haloalkyls comprising one to 20 carbon atoms, and aryls; each $R^1$ is a radical independently selected from a group consisting of dienyls comprising one to 20 carbon atoms and polyetheryls described by formula $-(CH_2)_a\{O(CH_2)_b\}_cOR^2$, $R^2$ is selected from a group consisting of hydrogen, and acyl radicals described by formula $R^3CO-$, $R^3$ is an alkyl comprising one to 10 carbon atoms, $a=1$ to 10, $b=1$ to 10, and $c=0$ to 100; and $x=0$ to 50, $y=1$ to 50, and $x+y=1$ to 100.

53. A chlorine end-terminated organosiloxane according to claim 52, where R is methyl, $y=5$ to 50, $x+y=5$ to 50, $a=1$ to 3, $b=2$ to 3, and $c=0$ to 30.

54. A chlorine end-terminated organosiloxane according to claim 53 where $c=0$ and $R^2$ is a glycidyl radical.

55. An end-terminated organosiloxane described by formula

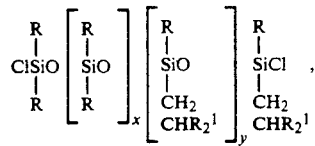

where each R is a radical independently selected from a group consisting of alkyls comprising one to 20 carbon atoms, cycloalkyls comprising four to 20 carbon atoms, haloalkyls comprising one to 20 carbon atoms, and aryls; each $R^1$ is a radical independently selected from a group consisting of dienyls comprising one to 20 carbon atoms and polyethyeryls described by formula $-(CH_2)_a\{O(CH_2)_b\}_cOR^2$, $R^2$ is selected from a group consisting of hydrogen, glycidyl, alkyls comprising one to 20 carbon atoms, and acyl radicals described by formula $R^3CO-$, $R^3$ is an alkyl comprising one to 10 carbon atoms, $a=1$ to 10, $b=1$ to 10, and $c=0$ to 100; and $x=0$ to 50, $y=1$ to 50, and $x=y=1$ to 100.

56. A chlorine end-terminated organosiloxane according to claim 55, where R is methyl, $y=5$ to 50, $x=y=5$ to 50, $a=1$ to 3, $b=2$ to 3, and $c=0$ to 30.

57. A chlorine end-terminated organosiloxane according to claim 56 where $c=0$ and $R^2$ is a glycidyl radical.

* * * * *